(12) United States Patent
Eisberg et al.

(10) Patent No.: US 6,558,544 B1
(45) Date of Patent: May 6, 2003

(54) PRESSURE VESSELS FOR HOLDING CYLINDRICAL SEMIPERMEABLE MEMBRANE CARTRIDGES

(75) Inventors: Douglas W. Eisberg, Escondido, CA (US); Andrew Panlasigui, San Diego, CA (US); Robert A. Uhlinger, Carlsbad, CA (US); Terry E. Gilbertson, Escondido, CA (US)

(73) Assignee: Progressive Composite Technologies, Inc., Vista, CA (US)

( * ) Notice: Subject to any disclaimer, the term of this patent is extended or adjusted under 35 U.S.C. 154(b) by 106 days.

(21) Appl. No.: 09/735,189

(22) Filed: Dec. 4, 2000

(51) Int. Cl.[7] .............................. B10D 63/00; C02F 1/44
(52) U.S. Cl. .............................. 210/321.67; 210/321.6; 210/321.76; 210/321.85
(58) Field of Search ................................. 210/650–654, 210/321.85, 321.64, 321.6, 321.76, 321.67, 232, 238, 323.2; 96/4

(56) References Cited

U.S. PATENT DOCUMENTS

| | | | |
|---|---|---|---|
| 2,567,376 A | 9/1951 | Hedeman et al. ........... 210/166 |
| 3,223,240 A | 12/1965 | Muller ......................... 210/96 |
| 3,771,660 A | * 11/1973 | Smith .......................... 210/232 |
| 4,235,723 A | * 11/1980 | Bartlett, Jr. .............. 210/321.83 |
| 4,675,109 A | 6/1987 | Applegate et al. ........ 210/321.1 |
| 4,717,035 A | 1/1988 | Dirkin et al. .................. 230/3 |
| 4,746,430 A | * 5/1988 | Cooley .................. 210/321.85 |
| 5,137,631 A | 8/1992 | Eckman et al. .......... 210/321.8 |
| 5,174,900 A | * 12/1992 | Nichols ....................... 210/651 |
| 5,435,915 A | * 7/1995 | Connors, Jr. ............... 210/232 |
| 5,470,469 A | 11/1995 | Eckman ..................... 210/321.8 |
| 5,520,807 A | * 5/1996 | Myrna et al. .......... 210/321.75 |
| 5,645,626 A | 7/1997 | Edlund et al. ................. 95/56 |
| 5,720,411 A | 2/1998 | Darby et al. ................. 220/582 |
| 5,891,222 A | 4/1999 | Hilgendorff et al. ............. 96/7 |
| 6,126,724 A | * 10/2000 | Martin ............................ 96/4 |

FOREIGN PATENT DOCUMENTS

EP  0 943 367 A  9/1999

* cited by examiner

Primary Examiner—W. L. Walker
Assistant Examiner—Krishnan S Menon
(74) Attorney, Agent, or Firm—Fitch, Even, Tabin & Flannery

(57) ABSTRACT

A pressure vessel designed to hold a plurality of cylindrical cartridges in the form of cross-flow semipermeable membrane filtration elements having central permeate tubes that are interconnected to form a composite permeate passageway that extends axially of the pressure vessel. Several constructions are shown for compensating for assembly clearance and potential pressure vessel growth and uniquely biasing the column of cartridges towards the downstream end of the pressure vessel to prevent axial shuttling movement that could cause wear and deterioration of seals which would result in leakage and deterioration of product while providing for absorption of shock potentially promulgated from the downstream end should feed pressure be suddenly lost.

16 Claims, 2 Drawing Sheets

PRESSURE VESSELS FOR HOLDING CYLINDRICAL SEMIPERMEABLE MEMBRANE CARTRIDGES

This invention relates to pressure vessels having at least one removable end closure for providing full bore access to install and remove cylindrical semipermeable membrane cartridges. More particularly, the invention relates to providing pressure vessels for receiving and operating a plurality of cylindrical semipermeable membrane cartridges in a column to treat a liquid aqueous feed supplied thereto at superatmospheric pressure as part of a cross-flow filtration system.

BACKGROUND OF THE INVENTION

Cylindrical pressure vessels for holding one or multiple cylindrical cartridges useful in cross-flow filtration are shown in a number of U.S. patents including U.S. Pat. Nos. 4,717,035, 4,517,085, 4,781,830, 5,866,001 and 5,720,411. Cross-flow filtration is a type of separation using semipermeable membranes where only a portion of the feed liquid passes through the semipermeable membrane, with the remainder of the liquid flowing across the membrane and exiting from the other end of the filtration cartridge. In such an arrangement, there are two exit ports from the pressure vessel, i.e. one for the remainder of the now concentrated feed stream and one for the permeate.

When multiple cylindrical cartridges are included within a single pressure vessel, the liquid feed will generally enter one end and then flow serially through all of the cartridges exiting at the opposite end of the pressure vessel while the permeate flows spirally inward to a central porous permeate tube. In such an arrangement, each cartridge will have an open anti-telescoping plate (ATP) at each end, and some type of a connector will interconnect the permeate tubes of adjacent cartridges to create a combined permeate flow path centrally of the pressure vessel. Exemplary connectors 22 are shown in the '085 patent. In order to save space between cartridges in a column within a pressure vessel, such couplings are being designed to reside substantially entirely within the permeate tube, thus minimizing the distance between ATPs of adjacent cartridges.

All such connections in a pressure vessel subjected to superatmospheric pressure must of course contain suitable seals to prevent leakage. Generally O-ring seals, as shown at 49 in the '830 patent are used, but elastomeric seals of square cross-section, such as the item 117 in the '411 patent, have also been used. Effective seals have always been very important in cross-flow filtration operations to prevent the feed liquid from leaking into and contaminating the permeate. They have, however, become of even more importance when cross-flow filtration is carried out using multiple cartridges in one pressure vessel, as for the purification of seawater or the like, where leakage of such seals requires a shut-down of a pressure vessel and removal of cartridges and replacement of leaking seals which is expensive both in manpower and in loss of operational time. Because 40- or 60-inch long cartridges must be allowed some tolerance in longitudinal length and because such tolerances can be cumulative with respect to pressure vessels for holding multiple cartridges, it is necessary to build some. "assembly clearance" into the length of pressure vessels to assure multiple cartridges very close to the upper end of such tolerance can be accommodated. It has been determined that unusual wear in such seals can result from multiple cartridges shifting axially, i.e. shuttling, within a pressure vessel during the start-up and shutdown periods and that such problems need to be addressed to assure consistent high quality operation. These problems are further amplified in long length fiberglass-reinforced pressure vessels, e.g. over about 12 feet long, that, when subjected to superatmospheric pressure, have a tendency to grow slightly in length while a long membrane column has a tendency to shorten or collapse slightly when initially pressurized. Such changes in length under pressure would add to the assembly clearance and should also be taken into consideration lest they give rise to shuttling over a longer distance which would amplify the likelihood of resultant leakage of the higher pressure feed liquid into the permeate pathway.

Accordingly, in view of the foregoing, the search has continued for improvements which will assure continuous production of high quality permeate from systems employing a plurality of cylindrical cross-flow cartridges in a single pressure vessel.

SUMMARY OF THE INVENTION

Very broadly, the invention provides an arrangement whereby a biasing connection is made at one end of a pressure vessel designed to contain a plurality of cylindrical cartridges for use in a cross-flow filtration system. The biasing arrangement effectively compensates for assembly clearance, i.e. for tolerances in the axial length of spiral-wound cartridges which are evidenced at the time of initial loading of such cartridges in the pressure vessel, and for longitudinal growth of a polymeric pressure vessel as a result of initial pressurization to superatmospheric pressure as well as thereafter during extended operation under such pressure so as to maintain a stationary column. In addition, it is also able to absorb shocks that can be promulgated at the downstream end should there occur a sudden failure of a feed pump or some other happenstance that would cause immediate loss of liquid pressure at the feed inlet.

More specifically, the invention provides a pressure vessel for holding a plurality of cylindrical cartridges axially aligned in end-to-end columnar arrangement, such as spirally-wound semipermeable membrane cartridges designed for cross-flow separation which individually each create permeate streams that flow spirally inward to a central tube which has a porous sidewall in the region of the spiral wrapping. Both ends of the pressure vessel are closed, one of them by a removable end closure that provides full bore access, and the individual cartridges are respectively coupled to one another to create a combined-flow permeate passageway extending axially of the pressure vessel. The removable end closure is associated with an improved connection assembly which plugs the permeate passageway at the feed end of the pressure vessel and provides a biasing arrangement for applying axial force against the end cartridge, and therefore all of the cartridges in the column; this stabilizes the column of cartridges against axial movement during operation so that it remains stationary while such biasing arrangement is also operable to absorb any force that may be intermittently applied to said column of cartridges from the downstream end while resulting in only minimal axial movement of said column.

In a particular aspect, the invention provides a system for providing an aqueous permeate from an aqueous feed, such as brackish water or seawater, supplied thereto under superatmospheric pressure which system incorporates a generally tubular pressure vessel of circular interior cross-section, closed at the downstream end and having a plurality of spirally-wound cross-flow cylindrical cartridges of semipermeable membrane material located as a column in end-to-end relationship within the pressure vessel bore. A removable end closure closes the upstream end of the pressure vessel, and separate ports supply an aqueous feed under superatmospheric pressure, discharge a liquid concentrate stream from a location near the downstream end thereof and discharge the aqueous permeate. The improvement comprises the provision of a biasing arrangement which is associated with the removable end closure and which applies an axial force at the upstream end of the column of cartridges that stabilizes the column against any significant axial movement within the pressure vessel during times of pressurization and/or depressurization, and which is also effective to compensate for assembly clearance and for changes in the longitudinal length of the pressure vessel under operating pressure so as to assure a stationary column of cartridges.

DETAILED DESCRIPTION OF THE PREFERRED EMBODIMENT

Figure 1:
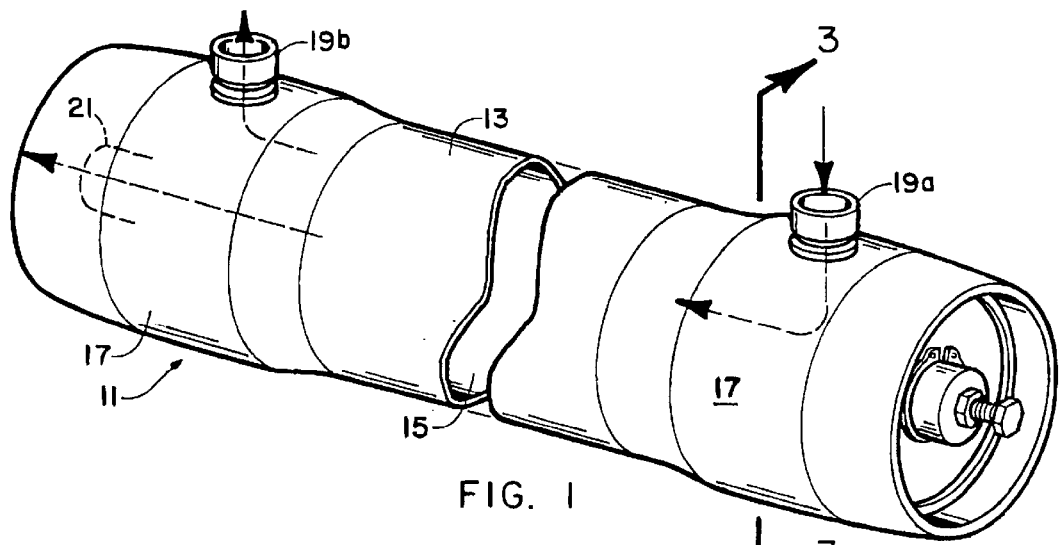
FIG. 1 is a perspective view of a cross-flow filtration pressure vessel embodying various features of the present invention.

FIG. 1 illustrates a pressure vessel 11 which includes a generally tubular shell or housing 13 which contains a bore 15 of substantially constant circular cross-section for its entire length, with the exception of two slightly enlarged or counterbore regions 15a at the inlet and outlet ends, which ends are preferably of similar construction. However, for purposes of the present invention, any suitable end closure might be provided at the downstream end of the tubular shell 13; for example, the pressure vessel 11 could even be dead-ended so that the installation and removal of the cylindrical cartridges could only take place via the full bore opening at the upstream end. The tubular shell has a slightly greater wall thickness in regions 17 at the upstream and downstream ends to support the engagement with a removable end closure and to provide adequate structural material to support the installation of recessed side ports 19a and 19b. In operation, the side port 19a will serve as the feed port and the side port 19b will serve as the concentrate exit port. Both are sealed with suitable O-rings 20 or the like. A permeate exit tube 21 exits centrally from the downstream end of the vessel as well known in this art.

The tubular shell 13 can be made of any suitable material that has the strength and stability to withstand the superatmospheric pressure to which the pressure vessel 11 will be subjected during operation. Although stainless steel or other corrosion-resistant alloys may be used, the most popular construction for pressure vessels of this type today is that of fiber-reinforced polymeric resin material, e.g. fiberglass-reinforced epoxy or polyurethane resin. For example, to accommodate six spiral-wound cartridges each having individual lengths of about 40 inches, a pressure vessel would be employed that has an overall length in the neighborhood of 260 inches, including the thickened or bell end portions 17 that are about 10 inches in length at each end.

Figure 3:
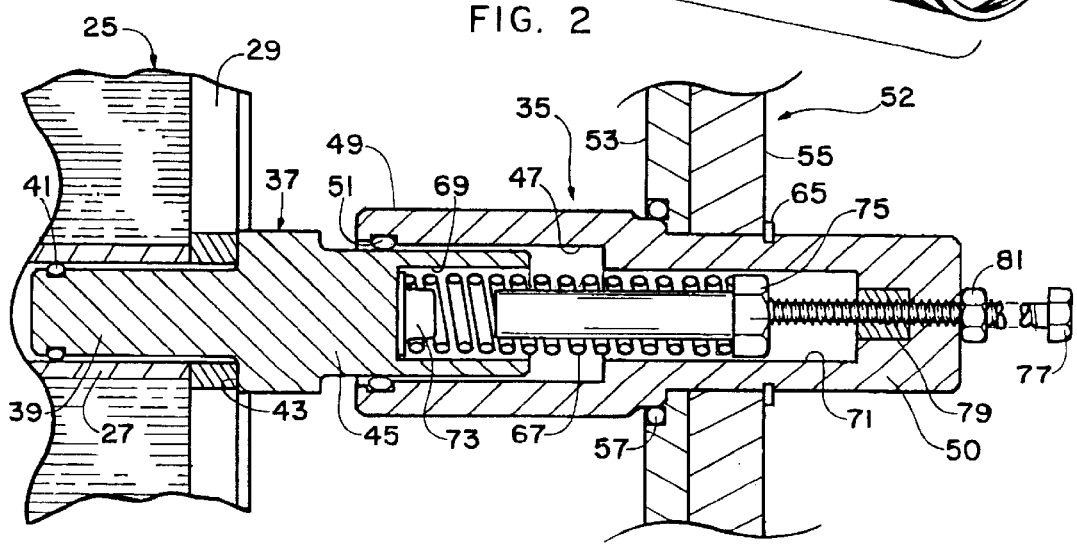
FIG. 3 is a fragmentary cross-sectional view, enlarged in size, taken generally along the line 3—3 of FIG. 1 showing the connector mated with the permeate tube of the upstream cartridge.
Figure 4:
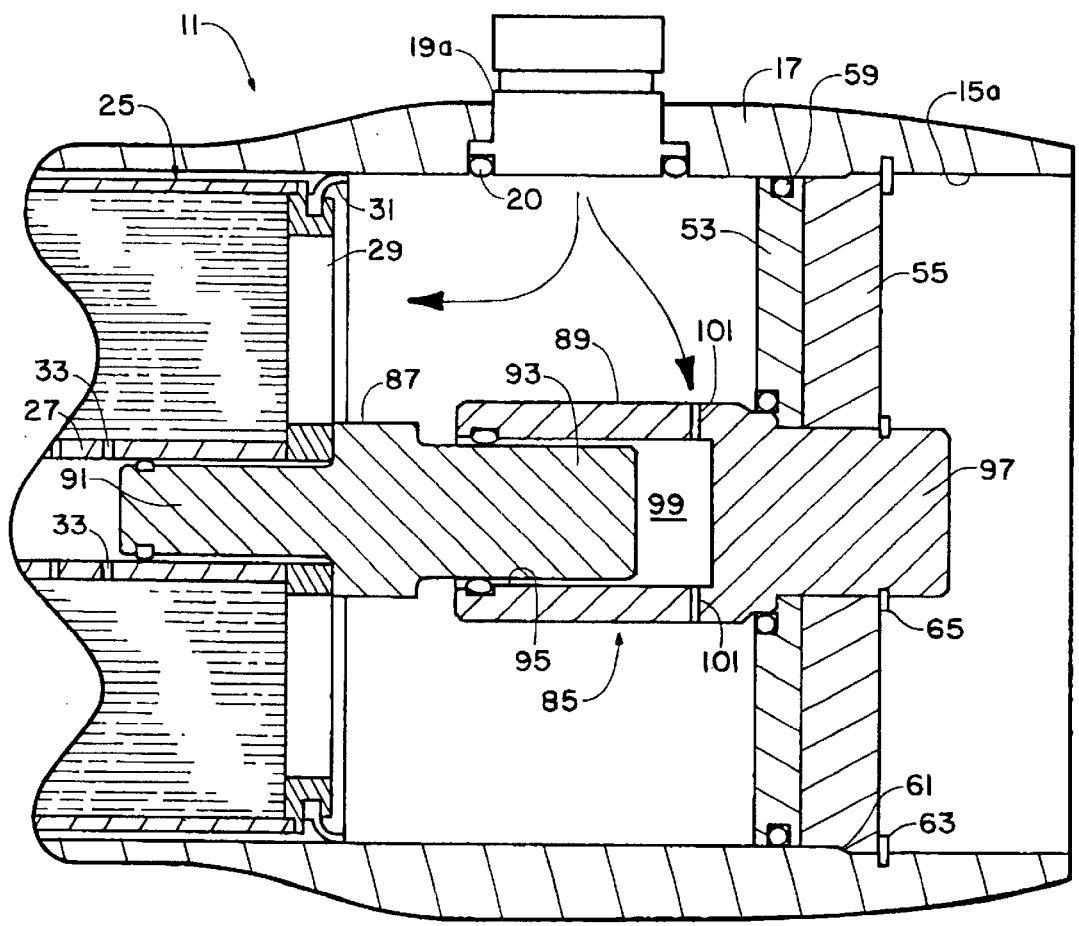
FIG. 4 is a cross-sectional view generally similar to FIG. 3 showing an alternative embodiment of a connector assembly, which also embodies various features of the present invention, in place within the pressure vessel of FIG. 1.

Although omitted from FIG. 1 for purposes of illustration, it would be understood that a plurality of cylindrical cartridges 25 would be accommodated in end-to-end arrangement as a column within the elongated tubular shell 13, and a portion of the upstream cartridge in such a column is illustrated in FIGS. 3 and 4. Each cartridge 25 will have a central permeate tube 27 about which a sandwich of sheetlike semipermeable membrane and flow channel-providing sheet material is spirally wound around, as is well known in this art. At each end, an anti-telescoping plate (ATP) 29 is attached, which is of wagon-wheel design and is also standard in this art to eliminate potential axial shifting of wrappings within the spiral-wound assembly. The cylindrical cartridge 25 is of a diameter so as to be closely accommodated within the bore 15 of the pressure vessel, and the upstream end of each cartridge contains a chevron or other suitable seal 31 surrounding the outer perimeter of the ATP, which assures that the entirety of the feed flow is directed through the axially extending passageways in the spirally-wound cartridge and does not bypass about the exterior of the cartridge. The central permeate tube 27 is porous along a major portion of its length, containing holes 33 which allow the permeate flowing spirally inward in the semipermeable membrane envelopes to enter the hollow permeate tube 27. Adjacent cartridges 25 are interconnected through standard coupling devices so that all of the permeate tubes 27 in the column of cartridges are coupled into a single permeate passageway leading to the permeate exit port 21 at the outlet end of the pressure vessel.

When the column of cartridges 25 has been loaded and the cartridges interconnected to one another by couplings, an adaptor or connector assembly 35 is inserted into the permeate tube 27 at the upstream end of the column. The assembly 35 includes a plug 37 which is symmetrical about a longitudinal axis and is of varying, preferably circular, outer cross-sectional shape. The plug 37 has a downstream end in the form of a stem 39 that is slidably received in the interior of the permeate tube, and it carries an annular seal 41, of preferably rectangular, e.g. square, cross-section, that effects a tight seal at this location and thus prevents any fluid communication between the permeate that will occupy the tube and the feed water that will flow under high pressure through the inlet port 19a and fill the upstream end 50 of the pressure vessel during filtration operation. The central portion of the plug 37 is enlarged in diameter and creates a shoulder 43 which seats against the end of the permeate tube 27 of the upstream cartridge as can be seen in FIG. 3. The plug has a upstream end 45 of slightly larger diameter than the stem 39 that is slidably received in a cavity 47 of circular cross-section that is formed in the downstream end of a housing 49. An O-ring seal 51 seals the annular opening at this sliding connection. The housing 49 has an upstream end of reduced diameter that extends through openings of comparable size and shape in a removable end closure 52 for closing and sealing the pressure vessel.

Any suitable end closure for a pressure vessel of the types well known in this art may be used; for example, one such as shown in the '830 or the '001 patent. Basically, the illustrated removable end closure 52 includes an inner seal plate 53, that may be made of thermoplastic material, such as PVC, which is located in juxtaposition with the interior surface of an outer metal bearing plate 55. The seal plate 53 carries an inner annular seal 57, that seals the junction where the housing 49 passes through the seal plate, and a peripheral annular seal 59 (see FIG. 4) where the seal plate approaches the interior of the bore 15 of the pressure vessel and which might alternatively be a chevron seal. As best seen in FIG. 4, the bearing plate 55 has an outer section of slightly greater diameter that is accommodated in the counterbore region 15a of the pressure vessel where it seats against an oblique shoulder 61 in the tubular shell 13. Once in position, the bearing plate 55 is secured in place by a snap ring 63 or a spiral ring that seats in an annular groove cut in the thickened end of the pressure vessel 17 to a depth equal to about one-half the radial width of the snap ring, as well known in this art. A small diameter snap ring 65 locks the housing 49 to the juxtaposed seal plate 53 and bearing plate 55.

Figure 2:
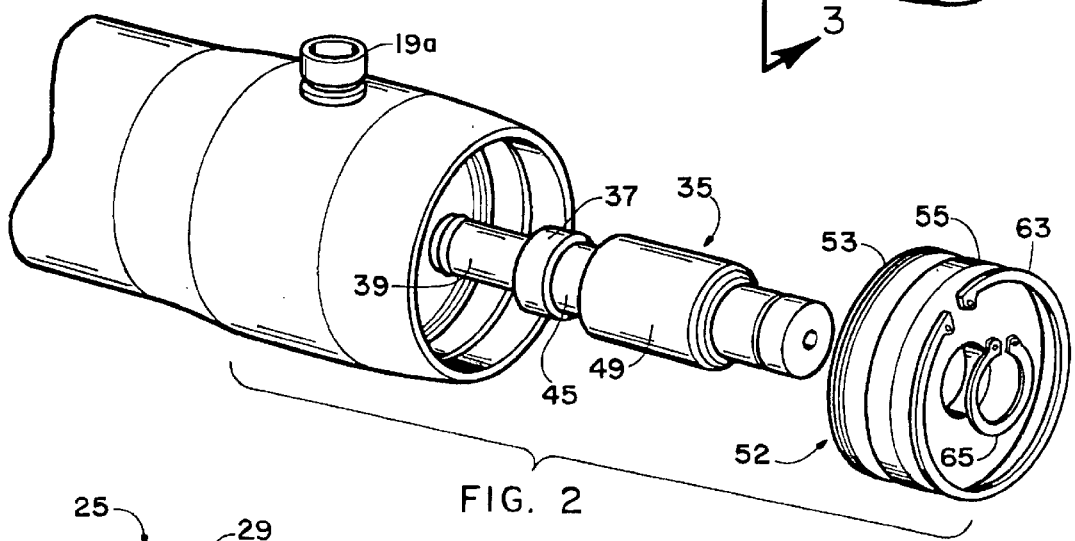
FIG. 2 is an exploded perspective view of the pressure vessel of FIG. 1 separately showing the removable end closure and the connector assembly which mates with the removable end closure and the upstream cylindrical cartridge.

Located within the interior of the connector assembly 35 is a biasing arrangement that accommodates tolerances in the axial lengths of individual spirally-wound cartridges 25, i.e. assembly clearance, while keeping the column of cartridges firmly in place in contact with the downstream end of the pressure vessel so that shifting, i.e. shuttling, does not occur during operation that would ultimately result in wear of the various seals and consequent leakage. In the embodiment shown in FIGS. 2 and 3, the biasing arrangement is provided by a longitudinally extending compression spring 67 that resides in a pair of facing cylindrical recesses 69 and 71, formed respectively in the upstream end of the plug 37 and in a central region of the housing 49. A short centering plug 73, which has a circular flange of a diameter just less than the interior diameter of the recess 69, is received in the downstream end of the compression spring 67 and assures its axial alignment within the recess. A post 75 with an enlarged head, which may simply be a carriage bolt or the like with the threaded end portion removed, is received in the upstream end of the compression spring 67 and likewise serves a centering function.

Adjustment of the longitudinal location of the plug 37 is achieved by turning an adjusting screw 77 that extends through a passageway in the end wall of the upstream end portion 50 of the housing, which passageway is coaxially located and provided with female threads. If the housing 49 were made from metal, the threads could be simply cut in the passageway. However, because the housing is preferably made of polymeric material, such as PVC or polyurethane, for reasons of economy, it has been found that a female-threaded metal insert 79 can be molded coaxially within the housing at the downstream location shown in FIG. 3 and will provide adequate strength. By so positioning and dimensioning the insert 79 so it occupies 50% or less of the end wall thickness, a thermoplastic molded component will exhibit adequate strength to support the application of substantial axial force against the column of cartridges. Once the appropriate axial adjustment has been made after installing a plurality of cylindrical cartridges 25 in the pressure vessel, the screw 77 is secured by a locknut 81.

In operation, once the plurality of cylindrical cartridges have been installed and coupled to one another, they are pushed axially by hand so as to seat against the downstream end and create a composite permeate passageway axially within the pressure vessel. The downstream stem 39 of the plug is then inserted into the upstream end of the cartridge column, and the pressure vessel end closure 51 is installed, inserting the snap rings 63 and 65 which lock the end closure in place. The system is then placed on line and brought up to pressure so the feed pressure will further assure the column of cartridges tightly seat one against the next. Thereafter, with the system at operating pressure and after some initial longitudinal expansion in the pressure vessel itself and some slight collapse in the length of the column may have occurred, clockwise turning of the adjusting screw 77 acts to cause the compression spring 67 to seat the plug 37 snugly against the upstream end of the permeate tube 27 of the upstream cartridge. Once heavy resistance is met that is evidence of snugness of the connections for the entire length of the column of cartridges, further turning of the adjusting screw 77 causes the compression spring 67 to compress and begin to bias the interconnected permeate tubes of the plurality of cartridges 25 against the downstream end of the pressure vessel. Once it has been determined that the column is seated at the downstream end, the screw 77 is turned for a preset number of additional revolutions or fractions thereof. For example, if the pressure vessel holds only a single cartridge, turning one and a half revolutions should be sufficient, whereas if the pressure vessel contains six or more cartridges, a standard screw thread might be turned six to seven revolutions to achieve compression of the spring 67 equal to about one-quarter inch.

This improved biasing arrangement has several advantages, one of which is important when pressure vessels made of fiberglass-reinforced polymeric resin are used. When exposed to superatmospheric pressure, such pressure vessels are known to grow longitudinally, and although such growth is only measured in fractions of an inch, such growth would add to the "assembly clearance" initially, and more growth may gradually occur over extended periods of operation. This can thereafter result in repeated shifting of cartridges longitudinally within the bore 15 of the pressure vessel and consequent wear on the seals as a result of such shifting. However, any such shifting is obviated by the biasing arrangement which is initially set after the system is at pressure, and as growth may occur, the compression spring 67 will simply lengthen gradually to compensate for such further growth and thus maintain relative snugness between each pair of cylindrical cartridges 25 in the column. The particular compression spring used will be selected based upon pressure for which the vessel will be rated. For example, for seawater desalination at a pressure of 600–1500 psi, a spring having a spring constant of about 600–650 inch-pounds may be used whereas for low pressure operation at about 100 to 450 psi, a spring with a spring constant of about 400 inch-pounds may be used. Moreover, should sudden decompression occur, as by loss of pressure in a feed pump, so that the feed pressure at the inlet port 19a suddenly drops to atmospheric, there will momentarily be a higher brine pressure at the downstream end of the pressure vessel, past the labyrinth of seals, that would have an instant effect of driving the column of cartridges 25 back toward the upstream end. This surge could well result in fracture of one or more ATP plates if a totally rigid connection were in existence. However, in the illustrated biasing arrangement, the compression spring 67 is inherently available to simply absorb this momentary shock and, in this manner, avoid potential damage to any of the cartridges in the column.

Illustrated in FIG. 4 is the pressure vessel 11 which incorporates an alternative embodiment, i.e., a connector assembly 85 which is self-adjusting. Assembly 85 includes a plug 87 and a housing 89. The plug 87 has a stem 91 which carries an annular seal and is in all respects the same as that described with the stem 39. However, in the connector assembly 85, the upstream end of the plug 93 is solid and is slidingly received in a cavity 95 in the housing similar to the cavity 47 with a similar O-ring seal being provided between the two. The upstream end 97 of the housing is solid, and thus a substantially closed chamber 99 is created in the cavity 97 upstream of the flat end of the plug 87. Limited fluid access to this chamber 99 is provided by a plurality, e.g. three, of radially extending small diameter holes 101 that are drilled or otherwise suitably formed in the housing 89; they extend through this tubular portion to provide fluid communication between chamber 99 and the interior of the upstream end of the pressure vessel adjacent the feed port 19a. As a result of this construction, an automatic hydraulic biasing and adjusting feature is created.

In operation, when the pressure vessel shown in FIG. 4 having the connection assembly 85 has been loaded and is ready for operation, a supply of brackish or saline water is pumped through the feed port 19a, as for example at 300 psig, and pressurizes the interior of the pressure vessel, and the radial passageways 101 allow the chamber 99 to fill with the aqueous solution at this pressure. The provision of a plurality of such passageways assures that the air originally in the chamber 99 will be displaced by the incoming aqueous solution. As a result, the chamber will be pressurized to the same pressure as that bearing upon the feed inlet side of the upstream cartridge 25. Accordingly, so long as the operation continues this inlet feed pressure assures that all of the cartridges are seated one against the other firmly against the downstream end of the pressure vessel; however, whenever depressurization occurs, for whatever reason, there will be a tendency for shuttling to occur. Because the pressure within the chamber 99 acting against the upstream face of the plug 93 is resisted only by the much lower pressure that may be in the permeate tube which is likely acting against a smaller diameter end face at the other end of the plug, this pressure differential also results in a downstream force vector that becomes important should pressure be lost. In this respect, should feed pressure suddenly be lost so that there would be a tendency for the downstream pressure to force the column of cartridges in an upstream direction, the immediate shock wave would be absorbed by the cushioning effect of the fluid-filled chamber 99. Moreover, there would be no immediate displacement of the column because the axial force vector that was just described would remain in effect until the liquid would leak out of the chamber 99 through the small diameter holes, which, because of the size of the holes, would not occur instantaneously, and as a result there will be ample time for pressure equalization throughout the pressure vessel to occur and shuttling would not occur. To assure that this advantageous result is achieved, it is believed that the diameter of the radial passageways 101 should be between about 0.02 and about 0.05 inch, which will allow the chamber 99 to adequately fill but will resist any sudden upstream displacement of the plug 87 until liquid can leak out the radial passageways.

Figure 5:
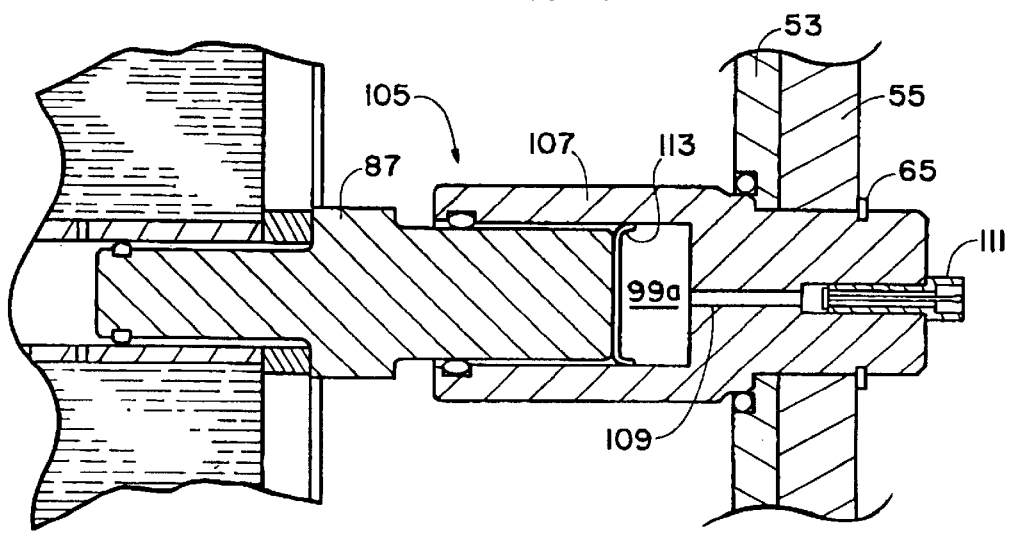
FIG. 5 is a fragmentary cross-sectional view generally similar to FIG. 4 showing another alternative connector assembly embodying various features of the present invention.

Illustrated in FIG. 5 is a third embodiment of a connector assembly 105 which utilizes a plug 87 of the same construction as described with respect to FIG. 4. A housing 107 is used that is also generally similar but, instead of including a plurality of radial passageways, includes a single coaxial passageway 109 in its upstream end wall that is closed by a simple spring-loaded valve 111 such as a Schraeder valve of the general type that is used for automobile or truck tires. Preferably, a more substantial seal 113 is provided between the plug 87 and the cavity wall of the housing to create a generally fluid tight cavity 99a.

Once the installation is complete and brought up to operating pressure, a simple air pump is used to pressurize the chamber 99a to the desired pressure that will adequately bias the plug 87 and the column of cylindrical cartridges downstream against the end of the pressure vessel. This assures that there will be no axial movement even if the pressure vessel should slowly continue to grow longitudinally in length, because the pressure within the chamber 99a will be adequate to continue to exert axial force against the plug which will assure that the column of cartridges continue to be firmly seat in end-to-end relationship against one another and the downstream end of the vessel. Again, should feed pressure be suddenly lost, the air cushion in the chamber 99a will absorb any momentary shock but will also maintain the column seated against the downstream end of the pressure vessel because the pressure within the chamber 99a will remain steady.

Although the invention has been described with regard to certain preferred embodiments which constitute the best mode known to the inventors at the present time for carrying out this invention, it should be understood that various changes and modifications as would be obvious to one having the ordinary skill in this art may be made without departing from the scope of the invention which is defined by the claims appended hereto. For example, one might less desirably locate the improved biasing arrangement in association with the end of a pressure vessel that is not removed so that the cartridges would be installed and removed from the opposite end. Moreover, the embodiments illustrated in FIGS. 3 and 5 could alternatively be installed at the downstream end of the pressure vessel. Although the invention is expected to be most advantageously used in pressure vessels that will hold two or more cartridges as a column, it will also be seen that it can be used with advantage to prevent premature wear in the seals of a single cartridge in a pressure vessel. Particular features of the invention are emphasized in the claims which follow.

What is claimed is:

1. A system for providing an aqueous permeate from an aqueous feed supplied thereto under superatmospheric pressure, which system comprises a generally tubular pressure vessel having an interior bore of circular cross-section, means closing a downstream end of said bore, at least one cylindrical cartridge, including semipermeable membrane material wrapped spirally about a central permeate tube, disposed within said pressure vessel bore, removable end closure means closing an upstream end of said pressure vessel, means for providing an aqueous feed under superatmospheric pressure to the interior of said pressure vessel at said upstream end, means for removing a liquid concentrate stream from said pressure vessel at a location near the downstream end thereof, means for removing aqueous permeate from said pressure vessel, and biasing means for applying an axial force at said upstream end to said cartridge independent of said superatmospheric feed pressure so as to prevent axial movement of said cartridge within said pressure vessel following pressurization that could create wear on seals associated with said cartridge and so as to absorb any force in an upstream direction that may be created by sudden depressurization while allowing only minimal axial movement.

2. A system for providing an aqueous permeate from an aqueous feed supplied thereto under superatmospheric pressure, which system comprises a generally tubular pressure vessel having an interior bore of circular cross-section, means closing a downstream end of said bore, a plurality of cylindrical cartridges each including spirally-wound semipermeable membrane material wrapped spirally about a central permeate tube and disposed within said pressure vessel bore in end-to-end relationship to form a column of cartridges, removable end closure means closing an upstream end of said pressure vessel, means for providing an aqueous feed under superatmospheric pressure to the interior of said pressure vessel at said upstream end, means for removing a liquid concentrate stream from a location near the downstream end of said pressure vessel, means for removing aqueous permeate from said pressure vessel, and biasing means for applying axial force at said upstream end of said column of cartridges during operation under said superatmospheric feed pressure and immediately after said feed pressure may be suddenly lost so as to prevent axial shuttling movement of said cartridges within said pressure vessel by absorbing any force in an upstream direction created by sudden depressurization while allowing only minimal axial movement.

3. A system for treatment of a superatmospheric liquid stream according to claim 2 wherein said force applying means includes means for establishing fluid pressure in a cavity, which cavity is closed by a slidable plug that bears against said column of cartridges.

4. A system for treatment according to claim 3 wherein said plug has a downstream adaptor section that includes a cylindrical part that slides within the interior of said central permeate tube and includes a circular seal of square cross-section.

5. A system for treatment of a superatmospheric liquid stream according to claim 3 wherein said fluid pressure establishing means includes a valved conduit supplying a gas under pressure to said cavity.

6. A system for treatment of a superatmospheric liquid stream according to claim 3 wherein said fluid pressure establishing means includes a plurality of passageways interconnecting said cavity with the upstream interior of said pressure vessel so that the superatmospheric liquid feed into said vessel pressurizes said cavity.

7. A system for treatment of a superatmospheric liquid stream according to claim 6 wherein said plurality of passageways are of such size so as to permit only slow release of said liquid pressure therefrom upon halting of feed pressure to said vessel.

8. A system for treatment of a superatmospheric liquid stream according to claim 2 wherein said biasing means includes compression spring means and wherein means for adjusting the loading of said compression spring means extends through said removable end closure means to a location exterior of said pressure vessel.

9. The system according to claim 1 wherein said tubular pressure vessel is made of fiberglass-reinforced polymeric resin which is subject to some stretching in axial length under internal pressure.

10. The system according to claim 1 wherein said biasing means is located at the upstream end of said pressure vessel and includes two interengaging elements in the form of a body having a cavity that is closed at one end and a plug which slides axially into said cavity, and wherein said biasing means applies force in said cavity against said slidable plug to bias said slidable plug in a downstream direction.

11. The system according to claim 10 wherein a plurality of spirally wound, cross flow cartridges are disposed in said pressure vessel, and wherein said biasing means includes means for creating a force within said cavity that bears against a head end of said plug which has an opposite adaptor end that is received in and seals the permeate tube of the end cartridge, said force biasing said plug in a downstream direction against said column of cartridges.

12. The system according to claim 11 wherein said biasing means includes a compression spring located within said cavity and means for axially displacing said spring toward said plug to load said spring and create a desired biasing amount of force upon said column of cartridges.

13. The system according to claim 12 wherein said displacing means is a threaded member which extends through said removable end closure means so as to be adjustable from the exterior of said pressure vessel.

14. The system according to claim 11 wherein means is provided for creating a desired amount of fluid pressure within said cavity to create said downstream force against said column of cartridges.

15. The system according to claim 14 wherein said cavity is fluidtight and wherein said fluid pressure creating means includes valve means for establishing a desired amount of pneumatic pressure in said cavity.

16. The system according to claim 11 wherein said plug opposite adaptor end carries a circular seal of rectangular cross-section that seals against the interior surface of said permeate tube forming part of said cross flow cartridge in which it is receive.

* * * * *